United States Patent [19]
Rich et al.

[11] Patent Number: 5,219,197
[45] Date of Patent: Jun. 15, 1993

[54] REINFORCING INSERT FOR AN AUTOMOTIVE BUMPER

[75] Inventors: Joseph W. Rich, Anderson; Dean M. Bayer; David S. Bryce, both of Anderson, all of Ind.; Richard G. Watson, Lansing, Mich.

[73] Assignee: General Motors Corporation, Detroit, Mich.

[21] Appl. No.: 933,635

[22] Filed: Aug. 24, 1992

[51] Int. Cl.⁵ .............................................. B60R 19/08
[52] U.S. Cl. ..................................... 293/120; 293/121; 293/122; 293/133
[58] Field of Search ............... 293/120, 121, 122, 132, 293/133, 134; 188/371, 377

[56] References Cited

U.S. PATENT DOCUMENTS

| | | | |
|---|---|---|---|
| 3,901,543 | 8/1975 | Norlin | 293/71 R |
| 3,930,665 | 1/1976 | Ikawa | 280/150 B |
| 3,997,207 | 12/1976 | Norlin | 293/71 R |
| 4,018,466 | 4/1977 | Norlin | 293/71 R |
| 4,116,480 | 9/1978 | Crestetto | 293/98 |
| 4,350,378 | 9/1982 | Wakamatsu | 293/120 |
| 4,422,680 | 12/1983 | Goupy | 293/122 |
| 4,856,833 | 8/1989 | Beckman | 293/120 |
| 5,114,198 | 5/1992 | Yamashita et al. | 293/120 |
| 5,139,297 | 8/1992 | Carpenter et al. | 293/132 |

Primary Examiner—Robert R. Song
Attorney, Agent, or Firm—A. Michael Tucker

[57] ABSTRACT

An automotive bumper includes a closed cross section impact bar having at least one open end. An insert formed as a plurality of interconnected molded cells is received in the open end and spans the distance between front and rear walls of the impact bar. A positioning rib prevents overtravel of the insert and tuning bumps are provided to create an interference fit between the insert and the impact bar. An energy absorber can be mounted on the impact bar and fitted with the positioning rib of the insert.

16 Claims, 2 Drawing Sheets

REINFORCING INSERT FOR AN AUTOMOTIVE BUMPER

BACKGROUND OF THE INVENTION

1. Field of the Invention

The present invention relates to automotive bumpers, and in particular is concerned with a closed cross section impact bar reinforced with an insert.

2. Description of the Related Art

Soft bumper systems for both front and rear ends of automobiles are well-known. Generally, an impact bar is mounted to the frame or support structure with fasteners or other suitable means. Impact bars are designed to resist deformation during impact, and reduce damage to the body and other components. Oftentimes, an energy-absorbing medium, e.g., foam or cellular units, is mounted on the outer face of an impact bar to absorb energy imparted by a collision. A fascia, formed from a pliable material, is fitted over the energy-absorbing medium to provide an attractive outer surface of the bumper system.

Various profiles and cross sections are used for impact bars. Some cross sections are open due to a C-shaped beam, while others are closed via a box-shaped beam. Closed cross section beams can be formed with thin walls of sheet metal to produce lightweight and effective impact bars.

It is desirable that impact bars resist deformation during minor impacts, thereby eliminating the costs involved in repair or replacement of the impact bar. A particular area of interest is the prevention of deformation at the ends or corners of closed cross section impact bars.

SUMMARY OF THE INVENTION

The present invention includes a reinforced automotive bumper assembly. A reinforcing insert is received at an open end of a closed cross section impact bar to provide increased resistance to deformation. The insert effectively transfers impact energy from a front surface to a better supported rear surface of the impact bar. Increased stiffness reduces deformation and is desirable for bumper sensors used in the deployment of a supplemental inflatable restraint (SIR). The stiffness attributable to the insert can be tuned by adding or removing walls in a multi-cellular insert, and/or by varying the thickness of walls or the material of the insert.

In a preferred embodiment, an automotive bumper includes a closed cross section impact bar having at least one open end. An insert formed as a plurality of interconnected molded cells is received in the open end and spans the distance between front and rear walls of the impact bar. A positioning rib prevents overtravel of the insert and tuning bumps are provided to create an interference fit between the insert and the impact bar. An energy absorber can be mounted on the impact bar and fitted with the positioning rib of the insert.

Detailed Description of the Preferred Embodiment

Figure 1:
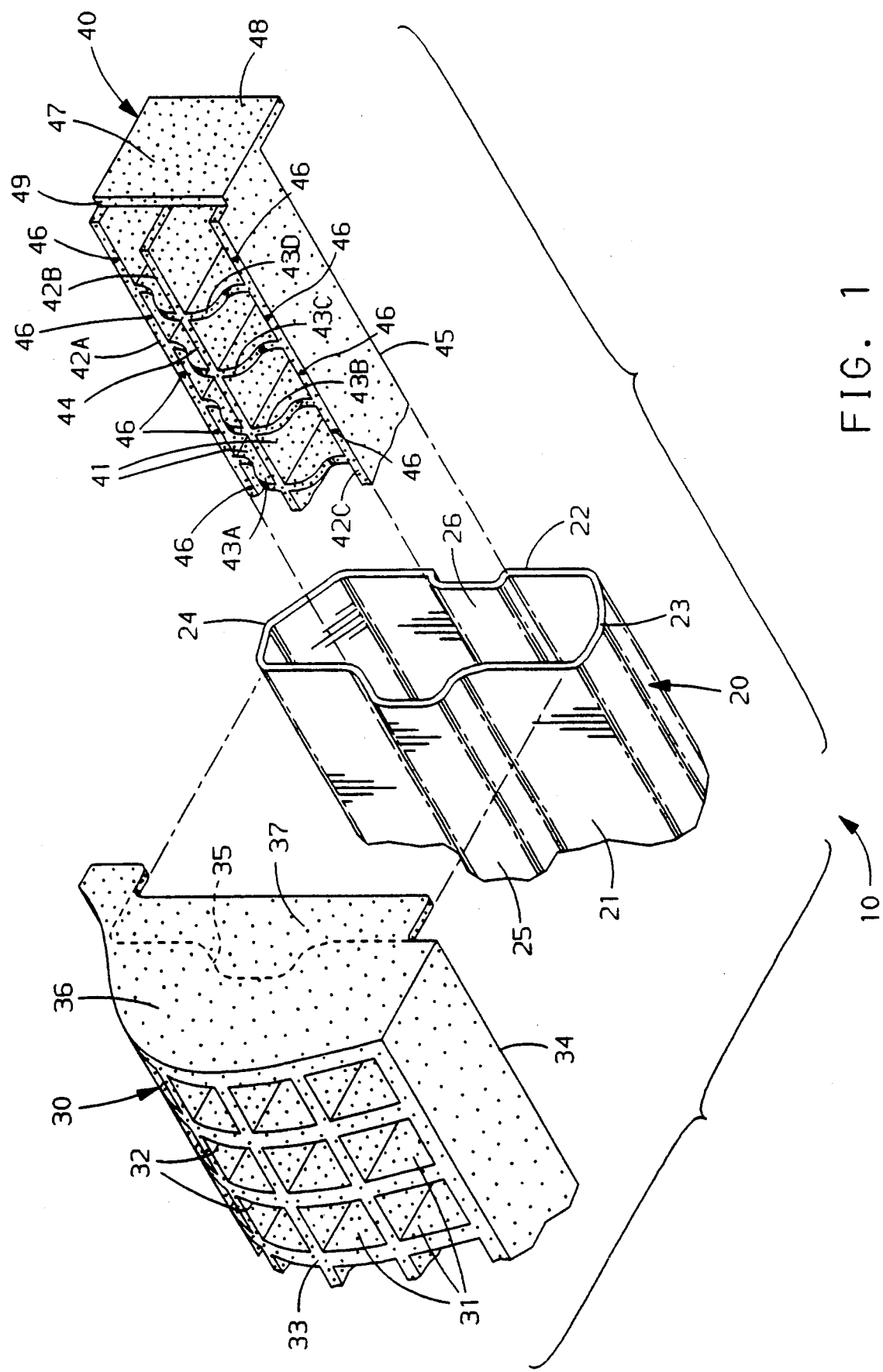
FIG. 1 is an exploded perspective view illustrating one open end of an impact bar, an energy absorber and a reinforcing insert for an automotive bumper assembly.
Figure 2:
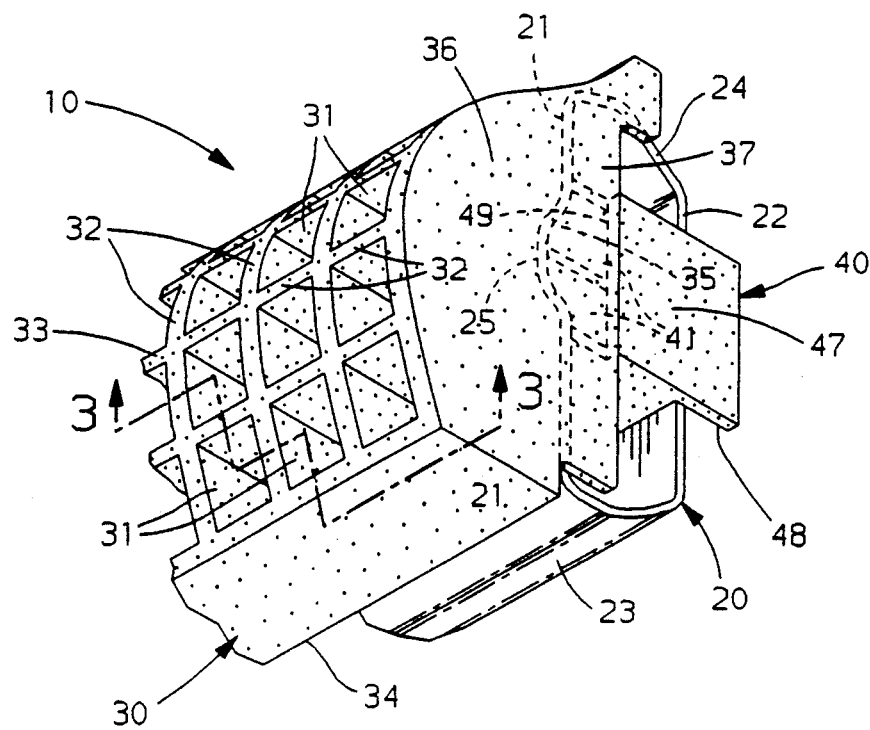
FIG. 2 is a perspective view of the elements of FIG. 1 after assembly.
Figure 3:
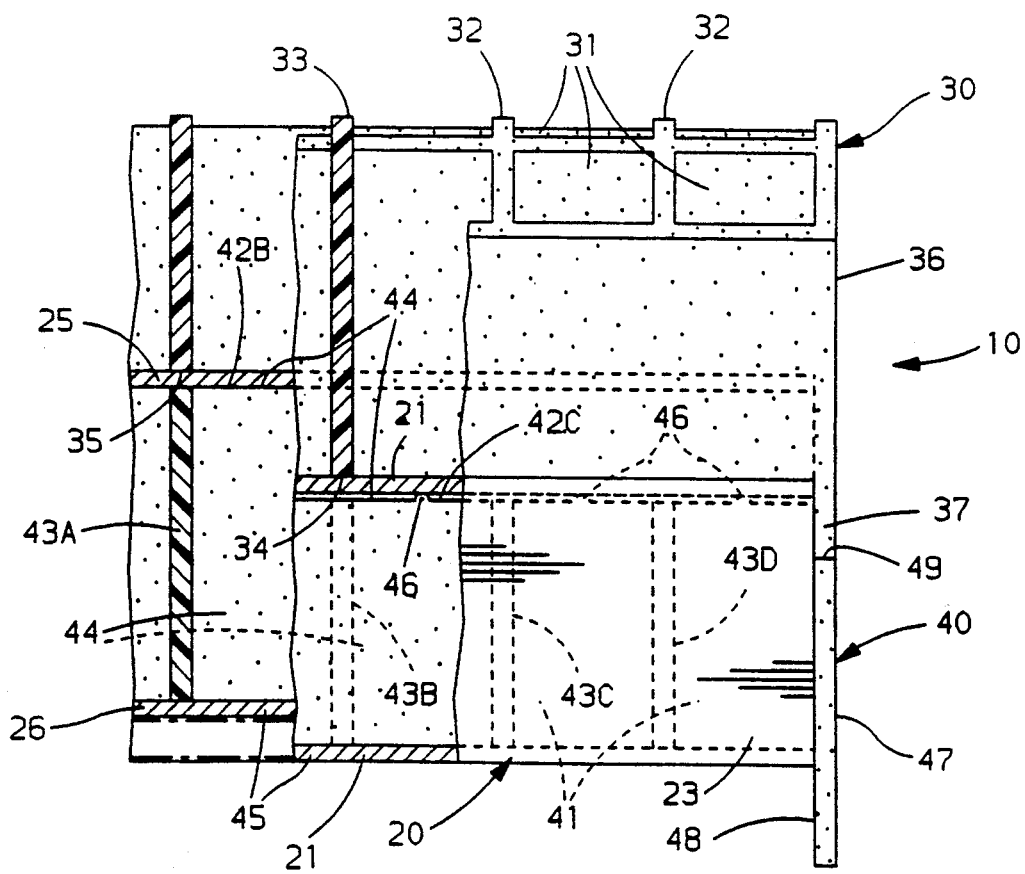
FIG. 3 is an enlarged bottom view taken along line 3—3 of FIG. 2 with portions removed for clarity illustrating the fit of a positioning rib on the energy absorber into an offset of the reinforcing insert.

An automotive bumper assembly is indicated generally at 10 in FIGS. 1-3. The assembly 10 includes an impact bar 20, an energy absorber 30, and a reinforcing insert 40.

The impact bar 20 has a closed cross section or "box-shaped section" so that it forms a hollow member which spans the approximate width of the front or rear of an automobile. The impact bar 20 terminates in right and left open ends, only one of which is illustrated in FIG. 1. If desired, the ends of the impact bar 20 can be formed as rounded corners.

Preferably, the impact bar 20 is formed from thin sheet metal and includes a front impact wall 21 and a rear support wall 22 connected by side walls 23 and 24. The support wall 22 is attached to a vehicular frame (not illustrated) in any suitable manner. An outwardly-projecting strengthening rib 25 is provided at a central portion of the impact wall 21 parallel to the longitudinal axis of the impact bar 20. A similar strengthening rib 26 can be provided at a central portion of the support wall 22.

The energy absorber 30 is preferably formed as an elastic deformable plastic element consisting of a plurality of interconnected molded cells 31. Each cell 31 has a rectangular cross section and shares at least one common partition wall 32 with an adjacent cell 31. Collectively, the cells 31 have a front impact surface 33 which can be shaped to produce a desired contour. When assembled on a vehicle, the impact surface 33 is covered with a well-known fascia (not illustrated). A rear support surface 34 is contoured to fit the impact wall 21 and includes a longitudinal channel 35.

The energy absorber 30 is secured to the impact bar 20 by fasteners (not illustrated) or other suitable means and may be formed in a plurality of sections. In the embodiment illustrated in FIGS. 1-3, an end portion of energy absorber is designed to be mounted at the end of the impact bar 20. An end wall 36 extends past the support surface 21 to form a positioning rib 37 which aids in the longitudinal positioning of the end portion of the energy absorber 30 at assembly.

The reinforcing insert 40 is preferably formed as a semi-elastic stiffened plastic element having a plurality of interconnected cells 41. In the embodiment illustrated, horizontal walls 42A, 42B and 42C are connected by vertical walls 43A, 43B, 43C, and 43D. The insert 40 is sized to preferably cover the portions of the impact and support walls 21, 22 containing respective ribs 25, 26 and spans the distance between the walls 21, 22. In this manner, the insert 40 adds increased buckling strength to the impact bar 20 and transfers impact energy from the impact wall 21 to the support wall 22. A material such as low linear density polyethylene has been found acceptable for the insert 40.

Collectively, the cells 41 have a front surface 44 contoured to complement the impact wall 21. Likewise, a rear surface 45 of the insert 40 is contoured to complement the support wall 22. In the embodiment illustrated, the contoured front and rear surfaces 44 and 45 limit the vertical movement of the insert 40 when inserted into the impact bar 20.

A plurality of raised tuning bumps 46 are provided on the front surface 44. In the embodiment illustrated, tuning bumps 46 are provided on the horizontal walls 42A and 42C. In other embodiments, tuning bumps can provide on other surfaces, e.g., vertical walls 43A-43D and rear surface 45. The tuning bumps 46 are of sufficient height to create a slight interference between the insert 40 and the impact bar 20 and are of small enough cross section to permit shear in cases of extreme interference so as to compensate for manufacturing tolerances. The tuning bumps 46 secure the insert 40 inside the impact bar 20 and reduce vibrations and noise during dynamic vehicle conditions.

An end wall 47 of the insert 40 extends past the support wall 21 when the insert 40 is received inside the impact bar 20 and forms a positioning rib 48. The rib 48 prevents overtravel when the insert 40 is inserted into the impact bar 20. An offset 49 in the end wall 47 permits the positioning rib 37 to engage end surfaces of the horizontal walls 42A, 42B, 42C and retain the insert 40 without fasteners inside the impact bar 20 when the energy absorber 30 is secured to the impact bar 20.

The reinforcing insert 40 increases deformation resistance of a closed cross section impact bar 20 and a vehicular body in relatively minor corner impacts occurring at the end of the impact bar 20.

Although the present invention has been described with reference to a preferred embodiment, workers skilled in the art will recognize that changes may be made in form and detail without departing from the spirit and scope of the invention.

The embodiments of the invention in which an exclusive property or privilege is claimed are defined as follows:

1. An automotive bumper assembly comprising:
   (a) an impact bar having a closed cross section and at least one open end;
   (b) reinforcing means inserted into the open end of the impact bar; and
   (c) means to prevent overtravel of the reinforcing means when the reinforcing means is inserted into the open end.

2. The bumper assembly specified in claim 1 wherein the means to prevent overtravel is integrally formed with the reinforcing means.

3. The bumper assembly specified in claim 1 wherein the reinforcing means includes a plurality of interconnected cells molded from a semi-elastic stiffened plastic material.

4. The bumper assembly specified in claim 3 wherein the plastic material is low linear density polyethylene.

5. The bumper assembly specified in claim 1 including means for producing an interference fit between the reinforcing means and the impact bar.

6. The bumper assembly specified in claim 5 wherein the means for producing the interference fit is integrally formed with the insert means.

7. The bumper assembly specified in claim 6 wherein the means for producing the interference fit is a plurality of raised tuning bumps.

8. The bumper assembly specified in claim 1 including energy absorber means mounted on the impact bar.

9. A reinforced automotive bumper assembly comprising:
   (a) an impact bar having a closed cross section formed by laterally spaced front and rear walls connected by side walls and at least one open end;
   (b) a stiffened plastic insert slidably inserted into the open end having a width sufficient to span the distance between the front and rear walls of the impact bar.

10. The bumper assembly specified in claim 9 wherein the insert includes means to prevent overtravel of the insert into the open end.

11. The bumper assembly specified in claim 10 wherein the means to prevent overtravel is a positioning rib integrally formed at an end of the insert so that the rib engages end surfaces of the open end and remains outside of the impact bar when the insert is positioned into the open end.

12. The bumper assembly specified in claim 11 including:
   (a) an energy absorber mounted on the front wall of the impact bar;
   (b) a positioning rib formed on the energy absorber so that the rib engages an end surface of the open end and remains outside of the impact bar when the energy absorber is mounted on the front wall.

13. The bumper assembly specified in claim 12 including an offset formed in the positioning rib of the insert for receiving the positioning rib of the energy absorber.

14. The bumper assembly specified in claim 9 including means for producing an interference fit between the insert and the impact bar.

15. The bumper assembly specified in claim 14 wherein the means for producing the interference fit is a plurality of raised tuning bumps molded on the insert.

16. The bumper assembly specified in claim 9 including a strengthening rib formed in the front wall of the impact bar.

* * * * *